US009088052B2

(12) United States Patent
Sim et al.

(10) Patent No.: US 9,088,052 B2
(45) Date of Patent: Jul. 21, 2015

(54) BATTERY MULTI-SERIES SYSTEM AND COMMUNICATION METHOD THEREOF

(75) Inventors: Sesub Sim, Yongin-si (KR); Jongwoon Yang, Yongin-si (KR); Susumu Segawa, Yongin-si (KR); Tetsuya Okada, Yongin-si (KR); Euijeong Hwang, Yongin-si (KR); Hanseok Yun, Yongin-si (KR); Beomgyu Kim, Yongin-si (KR); Jinwan Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1085 days.

(21) Appl. No.: 12/969,559

(22) Filed: Dec. 15, 2010

(65) Prior Publication Data

US 2011/0161024 A1 Jun. 30, 2011

(30) Foreign Application Priority Data

Dec. 24, 2009 (KR) ........................ 10-2009-0131113

(51) Int. Cl.
G06F 19/00 (2011.01)
H01M 10/44 (2006.01)
(52) U.S. Cl.
CPC .................................. H01M 10/441 (2013.01)
(58) Field of Classification Search
USPC .......................................................... 702/63
See application file for complete search history.

(56) References Cited

U.S. PATENT DOCUMENTS

2010/0019732 A1  1/2010  Utsumi et al.

FOREIGN PATENT DOCUMENTS

| JP | 2002-110259 | 4/2002 |
|---|---|---|
| JP | 2007-151396 | 6/2007 |
| JP | 2008-099482 | 4/2008 |
| JP | 2009-050085 | 3/2009 |
| KR | 10-0680901 B1 | 2/2007 |
| KR | 10-2008-0067081 A | 7/2008 |
| KR | 10-2009-0069189 A | 6/2009 |

OTHER PUBLICATIONS

Smart Battery Data Specification, Benchmarq Microelectronics Inc., Duracell Inc., Energizer Power Systems, Intel Corporation, Linear Technology, Maxim Integrated Products, Mitsubishi Electric Corporation, National Semiconductor Corporation, Toshiba Battery Co., Varta Batterie AG, All rights reserved, Revision 1.1 Dec. 11, 1998, 54 pages.*
English Machine Translation of Japanese Patent No. 2009-050085 listed above, 9 pages.
Korean Office Action dated Mar. 30, 2011 issued by the KIPO for corresponding Application No. 10-2009-0131113, 4 pages.
Machine Translation of JP 2002-110259.
Machine Translation of JP 2007-151396.

(Continued)

*Primary Examiner* — Tung S Lau
(74) *Attorney, Agent, or Firm* — Christie, Parker & Hale, LLP

(57) ABSTRACT

A battery multi-series system and a communication method thereof. The battery multi-series system includes a master battery management system managing a battery; and a block master battery management system connected to the master battery management system and receiving data from at least one slave battery management system and storing the received data, wherein the master battery management system receives data periodically from the block master battery management system.

10 Claims, 4 Drawing Sheets

(56) References Cited

OTHER PUBLICATIONS

Machine Translation of JP 2008-099482.

Korean Notice of Allowance dated Sep. 26, 2011 issued by KIPO in the corresponding Korean Patent Application Serial No. KR 10-2009-0131113.

\* cited by examiner

BATTERY MULTI-SERIES SYSTEM AND COMMUNICATION METHOD THEREOF

CROSS-REFERENCE TO RELATED APPLICATION

This application claims priority to and the benefit of Korean Patent Application No. 10-2009-0131113, filed on Dec. 24, 2009, the disclosure of which is incorporated herein by reference.

BACKGROUND

1. Field

Aspects of the present invention relate to a battery multi-series system and a communication method thereof.

2. Description of the Related Art

In general, a primary battery is not rechargeable, but a secondary battery can be charged and discharged. Thus, the secondary battery is extensively used in various fields such as a cellular phone, a notebook computer, a camcorder, and a hybrid car. Especially, since a lithium secondary battery has an output voltage of about 4.2 V, which is three times higher than a nickel-cadmium battery or a nickel-hydrogen battery, used for electronic equipment power) and has a high energy concentration per unit weight, usage of the lithium secondary battery has increased.

This lithium secondary battery includes a plurality of battery cells and is applied to diverse applications that require a high output, and also employs a Battery Management System (BMS) for managing controls of cell voltage sensing and battery cell balancing of the plurality of battery cells. Research has been conducted on the BMS in order to more efficiently control the plurality of battery cells.

SUMMARY

Aspects of the present invention are directed to a battery multi-series system and a communication method thereof, which substantially overcomes one or more of the problems due to the limitations and disadvantages of the related art.

Aspects of the present invention provide a battery multi-series system including: a master battery management system managing a battery; and a block master battery management system connected to the master battery management system and receiving data from at least one slave battery management system and storing the received data, wherein the master battery management system receives data periodically from the block master battery management system.

According to an aspect of the present invention, the master battery management system may store the periodically received data as periodic data, the periodic data including a battery temperature, a battery voltage, and a battery current of the battery.

According to an aspect of the present invention, the master battery management system may store the non-periodically received data as non-periodic data, the non-periodic data including a battery usage time, a battery usage period, a battery usage condition, a battery serial number, and a battery manufacturing date.

According to an aspect of the present invention, the master battery management system may communicate with the block master battery management system using a periodic protocol, the periodic protocol including a broadcasting method.

According to an aspect of the present invention, the master battery management system may communicate with the block master battery management system using a non-periodic protocol, the non-periodic protocol including a message method.

According to an aspect of the present invention, the slave battery management system may store data of the battery.

According to an aspect of the present invention, the battery multi-series system may further include a slave switch connected to the slave battery management system.

According to an aspect of the present invention, the slave battery management system may store data of an adjacent slave battery system.

According to an aspect of the present invention, the master battery management system may include: a master control unit controlling communication with the block master battery management system; a master communication unit communicating with the block master battery management system; and a master memory unit storing data received from the block master battery management system.

According to an aspect of the present invention, the block master battery management system may include: a block master control unit controlling communication with the master battery management system and the slave battery management system; a block master communication unit communicating with the master battery management system and the slave battery management system; and a block master memory storing data received from the slave battery management system.

According to an aspect of the present invention, the slave battery management system may include: a slave control unit controlling communication with the block master battery management system; a slave communication unit communicating with the block master battery management system; and a slave memory unit storing data of the battery.

Aspects of the present invention provide a communication method of a battery multi-series system including a master battery management system and at least one slave battery management system, the method including: a periodic battery data requesting operation periodically requesting battery data from the block master battery management system; a periodic battery data reception confirming operation confirming reception of the battery data; a periodic data storing operation storing the battery data; an external input confirming operation confirming whether there is an external input; a specific battery data requesting operation requesting specific battery data by the external input; a specific battery data reception confirming operation confirming reception of the specific battery data; and a non-periodic data storing operation storing the specific battery data as non-periodic data.

According to an aspect of the present invention, the periodic battery data requesting operation may include the block master battery management system fetching battery data, the battery data being stored in the slave battery management system.

According to an aspect of the present invention, the periodic battery data reception confirming operation may communicate using a periodic protocol, the periodic protocol including a broadcasting method.

According to an aspect of the present invention, the external input confirming operation may include the master battery management system confirming whether there is a user request or a device change.

According to an aspect of the present invention, the specific battery data reception confirming operation may communicate using a non-periodic protocol, the non-periodic protocol including a message method.

Additional aspects and/or advantages of the invention will be set forth in part in the description which follows and, in part, will be obvious from the description, or may be learned by practice of the invention.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
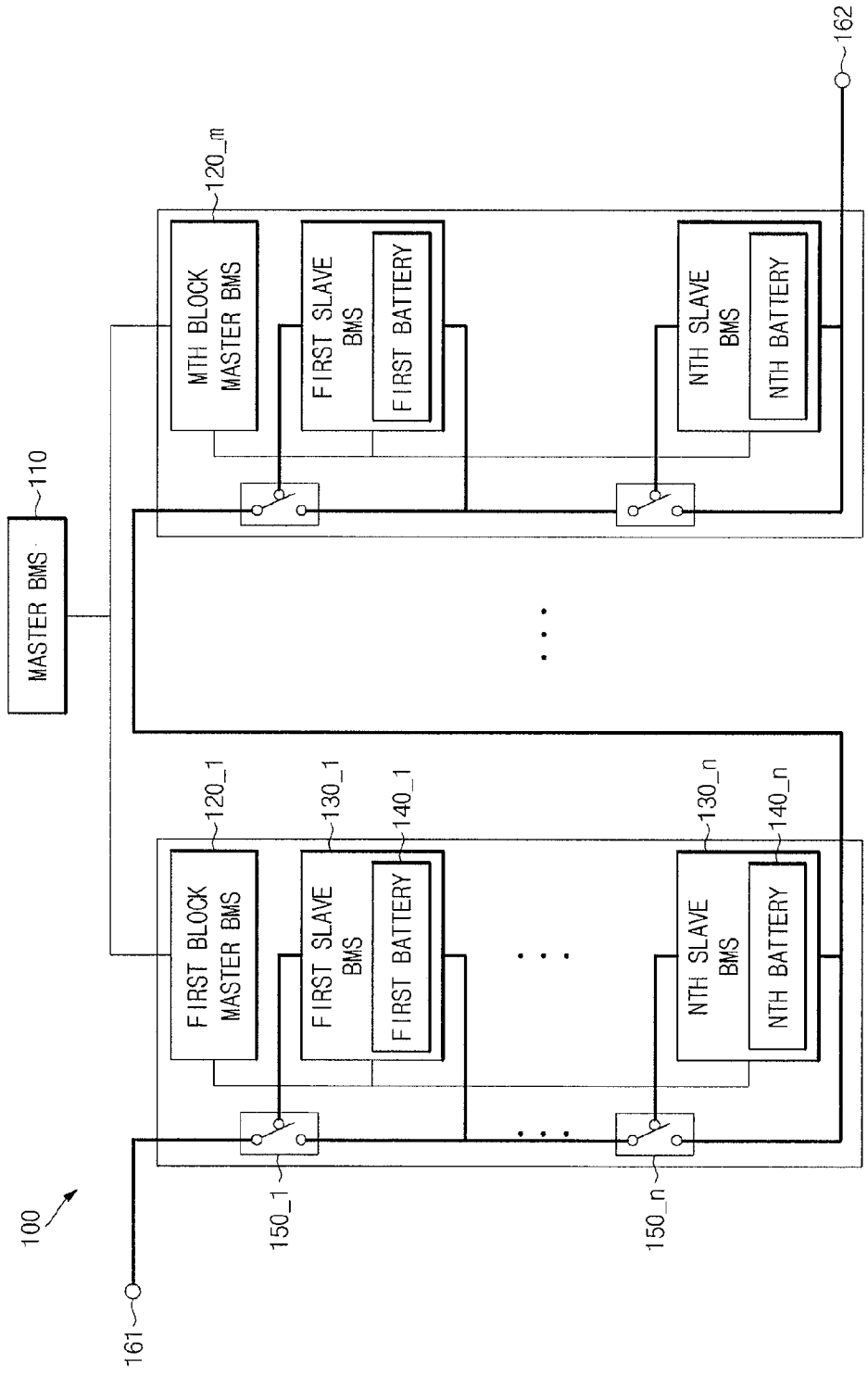
FIG. 1 is a block diagram illustrating a configuration of a battery multi-series system according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

As referred to herein, when a first element is described as being connected to a second element, the first element may not only be directly connected to the second element but may also be indirectly connected to the second element via a third element.

Figure 2:
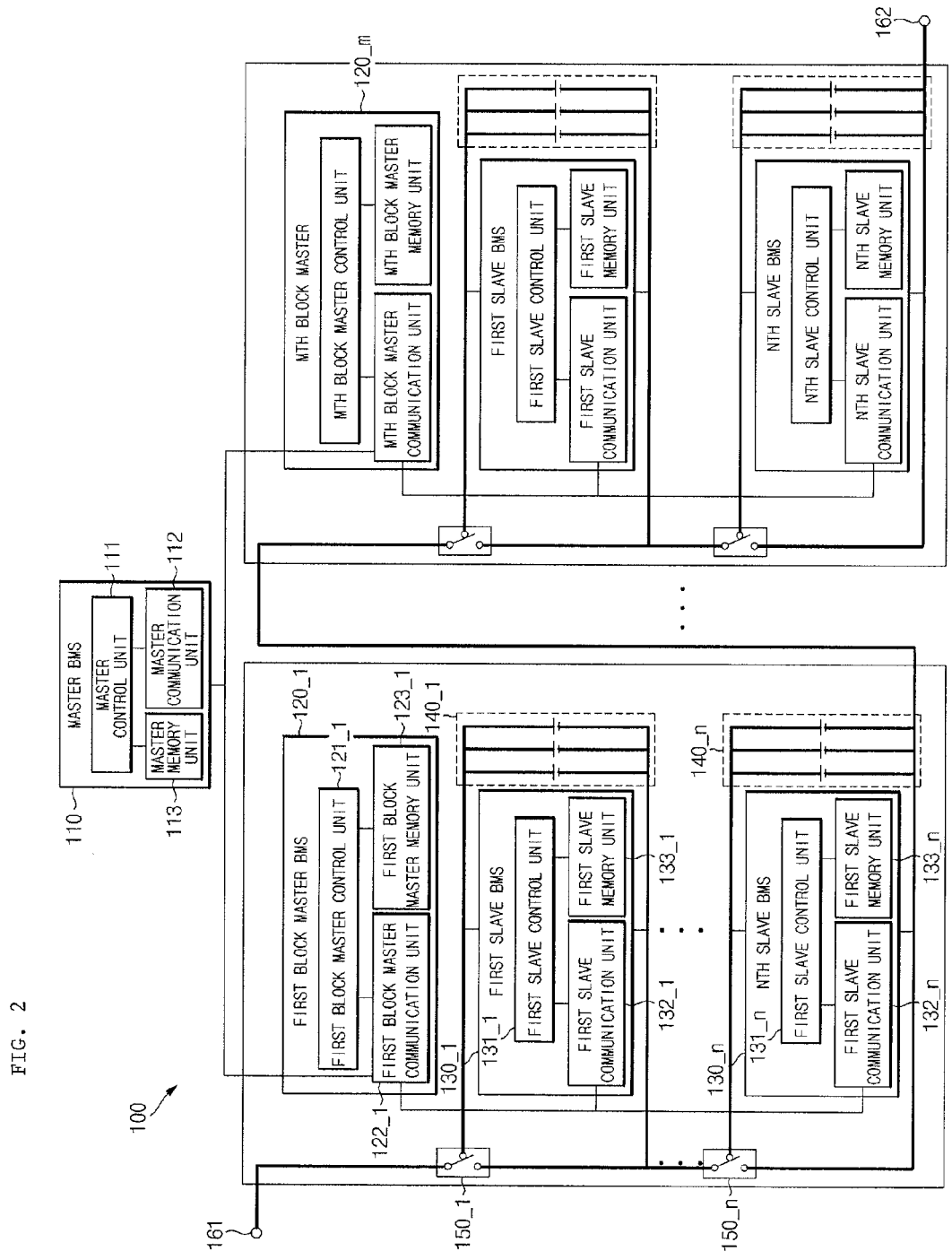
FIG. 2 is a detailed block diagram of the battery multi-series system of FIG. 1.
Figure 3:
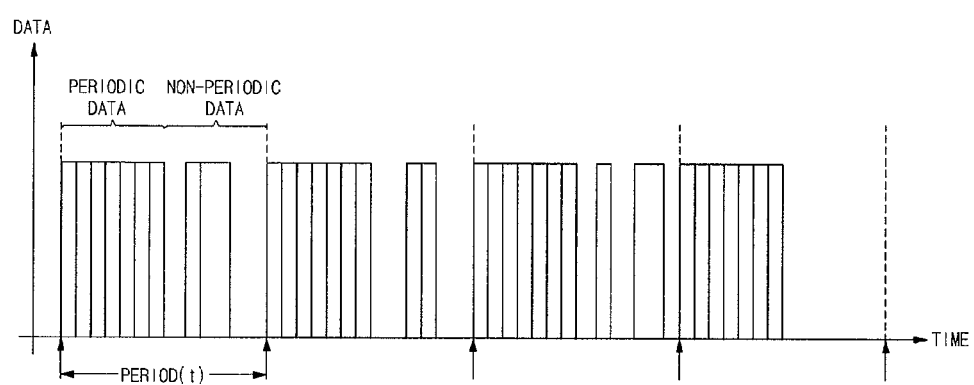
FIG. 3 is a graph illustrating data stored in a master memory of the battery multi-series of FIG. 2 where an x-axis and a y-axis represent time and data, respectively.

FIG. 1 is a block diagram illustrating a configuration of a battery multi-series system 100 according to an embodiment of the present invention. FIG. 2 is a detailed block diagram of the battery multi-series system 100 of FIG. 1. FIG. 3 is a graph illustrating data stored in a master memory 113 of FIG. 2 where an x-axis and a y-axis represent time and data, respectively.

Referring to FIGS. 1 and 3, the battery multi-series system 100, according to an embodiment of the present invention, includes a master Battery Management System (BMS) 110, block master BMSs 120_1 to 120_m (m is a natural number), slave BMSs 130_1 to 130_n (n is a natural number), batteries 140_1 to 140_n (n is a natural number), slave switches 150_1 to 150_n (n is a natural number), and external terminals 161 and 162. The above battery multi-series system 100 is connected to an external system such as an uninterruptible power supply device or a hybrid car through the external terminals 161 and 162, such that charging or discharging of the plurality of batteries 140_1 to 140_n can be performed.

At least one of the block master BMSs 120_1 to 120_m, which are connected in series, is connected to the master BMS 110 which controls the batteries 140_1 to 140_n connected to the block master BMSs 120_1 to 120_m, respectively. Here, the master BMS 110 performs 1:N communication with the block master BMSs 120_1 to 120_m through a broadcasting method. The master BMS 110 performs 1:1 communication with the block master BMSs 120_1 to 120_m through a message method.

The master BMS 110 receives data periodically from the block master BMSs 120_1 to 120_m through the above communication methods. The master BMS 110 defines the data as periodic data and stores them in a master memory unit 113. The periodic data includes a battery temperature, a battery voltage, and a battery current, which indicate a state of a battery. However, aspects of the present invention are not limited thereto and the periodic data may include other indicators of the state of the battery. The master BMS 110 receives and stores the periodic data and manages a state of the battery using the periodic data.

Moreover, the master BMS 110 receives data non-periodically from the block master BMSs 120_1 to 120_m. The master BMS 110 defines the data as non-periodic data and stores them in a memory. The non-periodic data includes a usage time of a battery, a usage period of a battery, a working condition of a battery, a serial number of a battery, and a manufacturing data of a battery. The master BMS 110 receives and stores the non-periodic data and manages a state of the battery using the non-periodic data.

Likewise, the master BMS 110 receives the periodic data and the non-periodic data to manage a state of the battery. Additionally, when the master BMS 110 detects an abnormal operation of the battery through the periodic data and the non-periodic data, it provides a control instruction to the block master BMSs 120_1 to 120_m of a corresponding battery to turn off a slave switch of the corresponding battery, such that its connection can be cut off.

The master BMS 110 includes a master control unit 111, a master communication unit 112, and a master memory unit 113. The master control unit 111 controls communication with at least one of the block master BMSs 120_1 to 120_m and also controls the master communication unit 112 and the master memory unit 113. The master control unit 111 determines which one of a periodic protocol and a non-periodic protocol is used when communicating with at least one of the block master BMSs 120_1 to 120_m. The periodic protocol is a broadcasting method, such as the 1:N communication method. The master BMS 110 communicates with the plurality of block master BMSs 120_1 to 120_m through the periodic protocol. The non-periodic protocol is a message method, such as the 1:1 communication method. The master BMS 110 receives necessary data of a battery using the non-periodic protocol.

The master communication unit 112 serves to substantially communicate with at least one of the block master BMSs 120_1 to 120_m in response to a control of the master control unit 111.

The master memory unit 113 classifies and stores the battery data, transmitted to the master BMS 110, as periodic data and non-periodic data. The periodic data includes a periodic temperature, a voltage, and a current of the batteries 140_1 to 140_n. The non-periodic data includes a usage time, a usage period, a usage condition, a serial number, and a manufacturing data of specific batteries, which are requested by the master BMS 110. These data are stored in the master memory unit 113 as shown in FIG. 3. The master memory unit 113 receives data periodically at a predetermined interval t and stores them therein. Additionally, the master memory unit 113 receives and stores non-periodic data in response to a control of the master control unit 111.

The block master BMSs 120_1 to 120_m receives and stores battery data from the slave BMSs 130_1 to 130_n. Additionally, the battery data are delivered to the master BMS 110. The block master BMSs 120_1 to 120_m receive data periodically or non-periodically from the slave BMSs 130_1 to 130_n. Although there may be at least one of the block master BMSs 120_1 to 120_m, the first block master BMS 120_1 is used as one example herein.

The first block master BMS 120_1 includes a first block master control unit 121_1, a first block master communication unit 122_1, and a first block master memory unit 123_1.

The first block master control unit 121_1 controls communication with the master BMS 110 and controls the first block master communication unit 122_1 and the first block master memory 123_1. In addition, the first block master control unit 121_1 controls communication with at least one of the slave BMSs 130_1 to 130__n. The first block master control unit 121_1 determines which one of a periodical protocol and a non-periodical protocol is used when being communicated with at least one of the slave BMSs 130_1 to 130__n. The periodic protocol is a broadcasting method, such as the 1:N communication method, and the first block master control unit 121_1 communicates with at least one of the slave BMSs 130_1 to 130__n. The non-periodic protocol is a message method, such as the 1:1 communication method and the first block master control unit 121_1 communicates with one of the slave BMSs 130_1 to 130__n and receives necessary battery data.

The first block master communication unit 122_1 serves to substantially communicate with the master BMS 110 and at least one of the slave BMSs 130_1 to 130__n in response to a control of the first master control unit 121_1.

The first block master memory unit 123_1 defines and stores the battery data transmitted to the first block master BMS 120_1 as periodic data and non-periodic data. The periodic data includes a periodic temperature, a voltage, and a current of the batteries 140_1 to 140__n and the non-periodic data include a usage time, a usage period, a usage condition, a serial number, and a manufacturing data of specific batteries, which are requested by the first block master BMS 120_1.

The slave BMSs 130_1 to 130__n receive and store the data of the batteries 140_1 to 140__n. Additionally, the data are delivered to the first block master BMS 120_1. Although there are more than one of the slave BMSs 130_1 to 130__n, a battery 140_1, which is connected to the first slave BMS 130_1 and the first block master BMS 120_1, is used as an example herein.

The first slave BMS 130_1 includes a first slave control unit 131_1, a first slave communication unit 132_1, and a first slave memory unit 133_1. The first slave control unit 131_1 controls communication with the first block master BM 120_1 and controls the first slave communication unit 132_1 and the first slave memory unit 133_1. The first slave control unit 131_1 controls transmission of battery data stored in the first slave memory unit 133_1 while receiving an instruction from the first block master BMS 120_1.

The first slave communication unit 132_1 communicates with the first block master BMS 120_1 in response to a control of the first slave control unit 131_1. The first slave memory unit 133_1 stores battery data. In addition, the first slave memory unit 133_1 receives data of the adjacent slave BMSs 130_1 to 130__n stored in the first block master 120_1 to control a battery connected to the slave BMSs 130_1 to 130__n.

The batteries 140_1 to 140__n are included in the slave BMSs 130_1 to 130__n, but are separately located for convenience of illustration in FIG. 2. The batteries 140_1 to 140__n are classified as a plurality of battery cells connected in parallel. Each of the plurality of battery cells is a rechargeable battery such as a lithium secondary battery. However, aspects of the present invention are not limited thereto, and other suitable rechargeable batteries may be used.

The slave switches 150_1 to 150__n are disposed between the external terminals 161 and 162 and the slave BMSs 130_1 to 130__n, and each of the slave switches 150_1 to 150__n are electrically connected to each other.

For example, the first slave switch 150_1 is disposed between the external terminal 161 and the first and second BMSs 130_1 to 130_2. The first slave switch 150_1 is connected to the first battery 140_1 with a turn-on state during normal times. That is to say, when the first slave switch 150_1 is in a turn-on state, connections are made in order from the external terminal 161 to the first slave switch 150_1, to the first battery 140_1, to the second slave switch 150_2, and to the second battery 140_2.

When the master BMS 110 detects abnormality of a battery and then provides a control instruction, the first block master BMS 120_1 receives the control instruction and provides an instruction to the first slave BMS 130_1. The first slave switch 150_1 is switched to an off state in response to the instruction of the first slave BMS 130_1. When the first slave switch 150_1 becomes a turn-off state, a connection with the first battery 140_1 is cut off. That is to say, when the first slave switch 150_1 is in a turn-off state, connections are made in order from the external terminal 161 to the first slave switch 150_1, to the second slave switch 150_2, and to the second battery 140_2.

As described above, when abnormality of a battery is detected, the slave switches 150_1 to 150__n establish bypass of the abnormal battery.

The external devices 161 and 162 are connected to the slave BMSs 130_1 to 130__n and serve as a connection terminal with an external system while the batteries 140_1 to 140__n are charged or discharged.

As mentioned above, the battery multi-series system 100 includes at least one of the block master BMSs 120_1 to 120__m connected to the master BMS 110, and shares a role of the master BMS 110 since at least one of the block master BMSs 120_1 to 120__m manages a corresponding block. Accordingly, the battery multi-series system 100 systematically manages the batteries 140_1 to 140__n even if the number of the batteries 140_1 to 140__n increases.

Additionally, the master BMS 110 communicates with the block master BMSs 120_1 to 120__m through a periodic protocol and a non-periodic protocol in the battery multi-series system 100. Accordingly, the battery multi-series system 110 receives data of the preferred batteries 140_1 to 140__n and efficiently manages the batteries 140_1 to 140__n by using a non-periodic protocol even if the battery multi-series system 110 expands and its data receiving period becomes longer.

Next, a communication method of the battery multi-series system 100, according to an embodiment of the present invention, will be described with reference to FIGS. 1 through 4. First, the battery multi-series system 100 includes the master BMS 110, the block master BMSs 120_1 to 120__m, the slave BMSs 130_1 to 130__n, the batteries 140_1 to 140__n, the slave switches 150_1 to 150__n, and the external terminals 161 and 162. Hereinafter, the master BMS 100, the first block master BMS 120_1, and the first slave BMS 130_1 will be mainly described.

Figure 4:
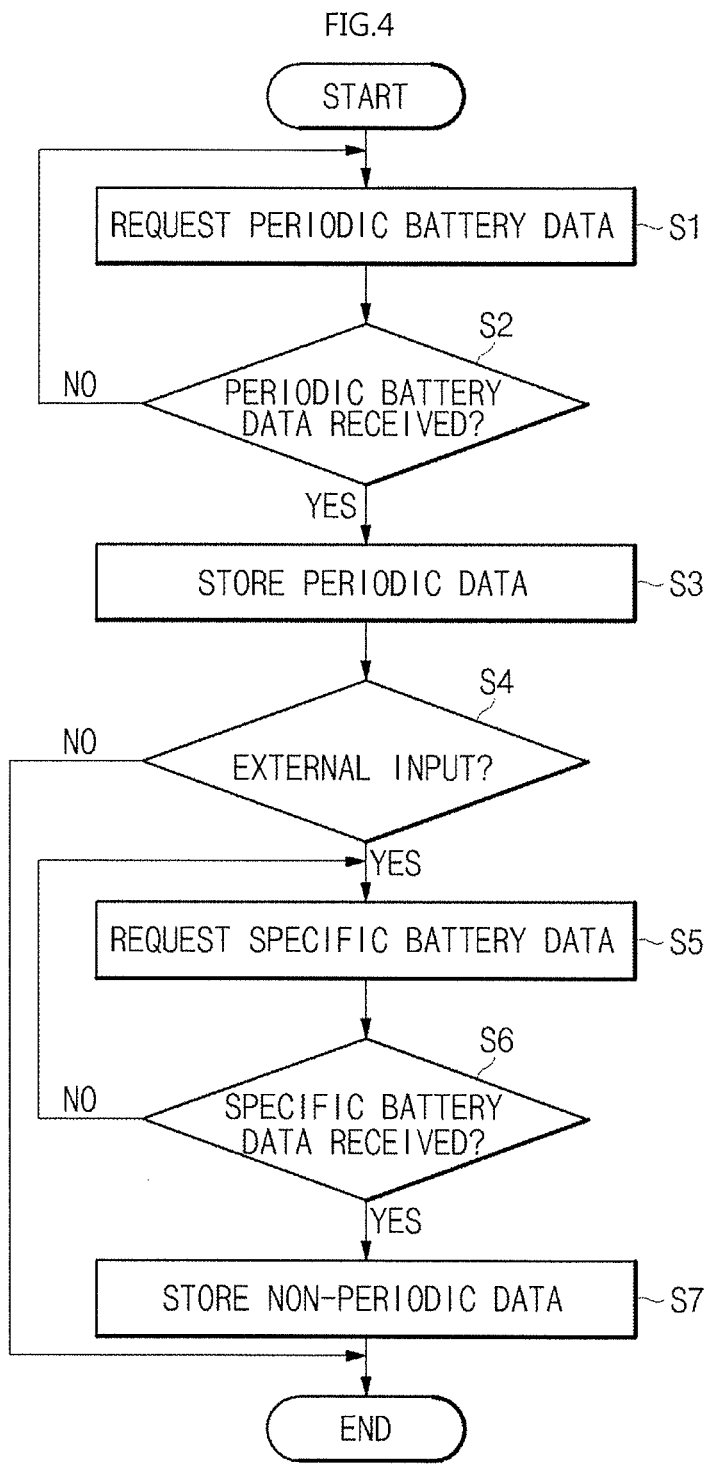
FIG. 4 is a flowchart illustrating a communication method of the battery multi-series system of FIG. 2.

FIG. 4 is a flowchart illustrating a communication method of the battery multi-series system 100 of FIG. 2. Referring to FIG. 4, the battery multi-series system 100 includes a periodic battery data requesting operation S1, a periodic battery data reception confirming operation S2, a periodic data storing operation S3, an external input confirming operation S4, a specific battery data requesting operation S5, a specific data reception confirming operation S6, and a non-periodic data storing operation S7.

In the periodic battery data requesting operation S1, the master BMS 110 transmits a signal to the first block master BMS 120_1 to request periodic battery data. The first block master BMS 120_1 receiving the signal from the master BMS 110 transmits a signal to the first slave BMS 130_1 to request battery data. The first slave BMS 130_1 transmits the stored battery data to the first block master BMS 120_1 and the first block master BMS 120_1 transmits the battery data to the master BMS 110.

In the periodic battery data reception confirming operation S2, if the master BMS 110 receives the periodic battery data from the first block master BMS 120_1, it stores the received periodic battery data as periodic data in the operation S3. Additionally, if the master BMS 110 does not receive periodic battery data from the first block master BMS 120_1, it requests the first block master BMS 120_1 again for the periodic battery data.

As mentioned above, during the periodic battery data requesting operation S1, the periodic battery data reception confirming operation S2, and the periodic data storing operation S3, the master BMS 110 communicates with the first block master 120_1 through a periodic protocol. The periodic protocol is a broadcasting method, which is a 1:N communication method, through which the one master BMS 110 communicates with the plurality of block master BMSs 120_1 to 120_m.

In the external input confirming operation S4, the master BMS 110 determines whether there is an external input or not. Here, the external input refers to a user request about specific battery data or a device change such as specific battery replacement. The master BMS 110 transmits a signal to the first block master BMS 120_1 to request specific battery data when there is an external input. The first block master BMS 120_1 receiving the signal from the master BMS 110 transmits a signal to the first slave BMS 130_1 to request specific battery data. The first slave BMS 130_1 transmits the stored specific battery data to the block master BMS 120_1 and also the block master BMS 120_1 transmits the specific battery data to the master BMS 110.

In the specific battery data reception confirming operation S6, if the master BMS 110 receives the specific battery data from the first block master BMS 120_1, it stores the received specific battery data as non-periodic data in the operation S7. Additionally, if the master BMS 110 does not receive specific battery data from the first block master BMS 120_1, it requests the first block master BMS 120_1 again for the specific battery data.

As mentioned above, in the specific battery data requesting operation S5, in the specific battery data reception confirming operation S2, and in the non-periodic data storing operation S7, the master BMS 110 communicates with the first block master 120_1 through a non-periodic protocol. The non-periodic protocol is a message method, which is a 1:1 communication method, through which the one master BMS 110 communicates with the first block master BMS 120_1.

As mentioned above, the battery multi-series system 100 includes at least one of the block master BMSs 120_1 to 120_m connected in series to the master BMS 110 and thus, shares a role of the master BMS 110. Accordingly, the battery multi-series system 100 systematically manages the batteries 140_1 to 140_n even a number of the batteries 140_1 to 140_n increases.

Additionally, according to the master BMS 110, according to an embodiment of the present invention, the master BMS 110 communicates with the block master BMSs 120_1 to 120_m through a periodic protocol and a non-periodic protocol. Accordingly, the battery multi-series system 110 receives data of the batteries 140_1 to 140_n and efficiently manages the batteries 140_1 to 140_n by using a non-periodic protocol even if the number of the batteries 140_1 to 140_n included in the battery multi-series system 110 increases and the battery multi-series system 110 data receiving period becomes longer.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery multi-series system for a plurality of multi-cell batteries connected in series, the battery multi-series system comprising:
   a master battery management system for managing the series-connected multi-cell batteries, each of the multi-cell batteries comprising a plurality of cells; and
   at least one block master battery management system connected to the master battery management system, and configured to
      receive first data from at least one slave battery management system, each of the at least one slave battery management system comprising a corresponding one of the multi-cell batteries, and
      store the received first data,
   wherein:
      the master battery management system is configured to receive the stored first data periodically from the at least one block master battery management system,
      the at least one block master battery management system is connected to the master battery management system in series and the at least one slave battery management system is connected to a corresponding one of the at least one block master battery management system in parallel,
      the block master battery management system comprises a plurality of block master battery management systems, and
      the master battery management system is further configured to broadcast a first request for the first data to each of the block master battery management systems.

2. The battery multi-series system as claimed in claim 1, wherein the master battery management system is further configured to store the periodically received first data as periodic data, the periodic data including a battery temperature, a battery voltage, and a battery current of each of the multi-cell batteries.

3. The battery multi-series system as claimed in claim 1, wherein the master battery management system is further configured to
   receive second data non-periodically from the block master battery management system, and
   store the non-periodically received second data as non-periodic data, the non-periodic data including a battery usage time, a battery usage period, a battery usage condition, a battery serial number, and a battery manufacturing date.

4. The battery multi-series system as claimed in claim 1, wherein
   each of the block master battery management systems is configured to:
      receive second data from the at least one slave battery management system, and store the received second data, and the master battery management system is further configured to receive the stored second data non-periodically from any specific one of the block master battery management systems, and send a second request for the second data to only the specific one of the block master battery management systems.

5. The battery multi-series system as claimed in claim 1, wherein each of the at least one slave battery management system is configured to store the first data of the corresponding one of the multi-cell batteries.

6. The battery multi-series system as claimed in claim 1, further comprising a corresponding at least one slave switch respectively connected to the at least one slave battery management system.

7. The battery multi-series system as claimed in claim 1, wherein one of the at least one slave battery management system is configured to store the first data of an adjacent one of the at least one slave battery management system.

8. The battery multi-series system as claimed in claim 1, wherein the block master battery management system comprises:

a block master control unit configured to control communication with the master battery management system and the at least one slave battery management system;

a block master communication unit configured to communicate with the master battery management system and the at least one slave battery management system; and a block master memory unit configured to store the first data received from the at least one slave battery management system.

9. The battery multi-series system as claimed in claim 1, wherein each of the at least one slave battery management system comprises:

a slave control unit configured to control communication with the block master battery management system;

a slave communication unit configured to communicate with the block master battery management system; and a slave memory unit configured to store the first data of the corresponding one of the multi-cell batteries.

10. The battery multi-series system as claimed in claim 1, wherein the master battery management system comprises:

a master control unit configured to control communication with the block master battery management system;

a master communication unit configured to communicate with the block master battery management system; and a master memory unit configured to store the first data received from the block master battery management system.

* * * * *